(12) United States Patent
Stiens et al.

(10) Patent No.: US 6,396,630 B1
(45) Date of Patent: May 28, 2002

(54) DEVICE AND METHOD FOR A FOLDED TRANSMISSIVE PHASE RETARDER

(75) Inventors: Johan Stiens, Brussels (BE); Vladimir Kotov, Shelkovo Mosc. Reg. (RU)

(73) Assignee: Rose Research, LLC, Dallas, TX (US)

( * ) Notice: Subject to any disclaimer, the term of this patent is extended or adjusted under 35 U.S.C. 154(b) by 0 days.

(21) Appl. No.: 09/811,334

(22) Filed: Mar. 16, 2001

(51) Int. Cl.⁷ .................................................. G02B 5/30
(52) U.S. Cl. ...................... 359/498; 359/497; 359/499; 359/500; 359/580; 359/900
(58) Field of Search .................... 349/121, 120, 349/119, 118, 117; 359/499, 498, 500, 483, 485, 487, 497, 580, 900

(56) References Cited

U.S. PATENT DOCUMENTS

| | | | | |
|---|---|---|---|---|
| 3,743,380 A | * | 7/1973 | Fugitt | 359/487 |
| 3,876,285 A | * | 4/1975 | Schwarzmüller | 359/487 |
| 4,536,063 A | * | 8/1985 | Southwell | 359/488 |
| 5,559,634 A | * | 9/1996 | Weber | 359/487 |
| 5,657,160 A | * | 8/1997 | Miyatake et al. | 359/487 |
| 5,688,566 A | * | 11/1997 | Broer et al. | 349/117 |

* cited by examiner

Primary Examiner—Cassandra Spyrou
Assistant Examiner—John Juba, Jr.
(74) Attorney, Agent, or Firm—Slater & Matsil, L.L.P.

(57) ABSTRACT

A compact transmissive phase retarder for large and high power laser beam applications is proposed. The laser beam is orthogonally incident on the flat input surface of the optical element and is emergent from the optical component via a second flat output surface. The cross-section of the optical element is characterized by a triangularly or trapezoidally folded surface. The folded surface replaces the inclined surface of bulk equivalent elements. The functionality of the device is provided by a multi-layer interferometric structure deposited on the folded structure.

23 Claims, 15 Drawing Sheets

US 6,396,630 B1

DEVICE AND METHOD FOR A FOLDED TRANSMISSIVE PHASE RETARDER

TECHNICAL FIELD OF THE INVENTION

The present invention relates to optical components, which influence the polarization state of incident polarized light. More in particular transmissive phase retarding elements with reduced dimensions and enhanced functionality for large laser beam applications are the subject of this invention.

BACKGROUND OF THE INVENTION

Phase retarders are optical components, which shift the phase between the two polarization components of an incident polarized laser beam. The introduction of a 90 degree phase shift is generally described as a linear-to-circular transformation. A phase shift of 180 degrees is typically described as changing the rotation of linearly polarized light. Phase retarding elements can be subdivided in reflecting and transmissive types. As the names imply, with reflecting phase retarders, the incident light is reflected back from the retarder element with a shifted phase, whereas with transmissive types, the phase shift is introduced as the incident light passes through the element.

For increased efficiency, phase retarders are required to have a high optical throughput. For a reflecting type retarder, the reflectivity of the surface should be as high as possible. For a transmissive phase retarder, the transmission of light through the element should be as high as possible.

For high power laser applications, the phase retarder needs to be able to withstand the high optical power of the incident laser beam. Additionally, high power laser applications typically involve a relatively large diameter laser beam. A typical beam in $CO_2$ laser optics can be from several millimeters up to several centimeters in diameter. Prior art phase retarders have needed to be commensurately large, resulting in bulky and expensive solutions in the past.

Prior Art 90 Degrees Phase Retarders

FIG. 1 illustrates a prior art phase retarder. The illustrated optical arrangement provides for a quarter wave plate (90 degrees phase shift) using a copper mirror 5 that operates in reflection mode at mid- or far-infrared (IR) wavelengths. Mid- and far-IR wavelengths typically range from 2–20 $\mu$m. Mirror 5 is comprised of metal substrate 1, upon which is coated multiple thin film layer 2. Metal substrate 1 is used because metals generally provide a high reflection coefficient. The multilayer coating 2 provides the phase shifting function. In the illustrated example, coating 2 is designed such that a laser beam 3 incident on the element surface at an angle of 45 degrees is converted into a reflected beam 4 at the same angle. The shift between the two polarized components of incident beam 3 is shifted by 90 degrees when the incident light is linearly polarized under an angle of 45 degrees with respect to the input plane of mirror 5. Note that the operation of the illustrated prior art phase retarder requires a redirection of the propagation path of the incident light beam 3. This is disadvantageous because of the need for critical alignment of various optical elements using such devices. Any adjustment of one optical element, such as the illustrated phase retarder, would result in a misalignment of all the other optical components of a system. If yet another polarization state of the infrared beam is desired (requiring yet another phase retarder), the complete system would need to be redesigned to allow for another optical clement introducing yet another redirection of the propagation path. Hence the prior art reflection type phase retarders have the disadvantage of requiring critical alignment between elements and make optical system design and redesign difficult.

When more flexibility is required in an optical arrangement, it is preferable that the phase retarder operates in transmission mode, to avoid the above discussed disadvantages. One prior art approach to transmission mode phase retarders uses birefringent materials. These types of retarders exploit the dependency of the refractive index of orientation of the polarization components of the incoming light beam. A phase shift is introduced between the polarization state aligned with the fast axis of the birefringent material with the smallest refractive index and the polarization state aligned with the slow axis, where the index of refraction is the highest. Because the two orthogonally polarized incident waves of the optical beam travel through the birefringent material at different speeds, there will be a phase shift between the two waves when they emerge from the material. By choosing an appropriate thickness for the birefringent material, the required phase shift can be implemented. For the mid- and far-IR wavelength applications, however, birefringent materials are expensive and are not heat resistant for high optical powers due to residual absorption. This limits their applicability in high power applications. Additionally, because the dimensions of the phase retarder scale with the beam size of the impinging optical beam, the result is very expensive and large devices are required to typical application beam sizes.

Prior Art 180 Degrees Phase Retarders

One common high power laser application is in the field of laser machining and laser cutting. In such applications, a high power, focused laser beam is used to cut or scribe a work piece (typically a metal work piece, although laser cutting is also employed with plastics, paper, and other materials). It is well known in laser cutting applications that the cutting profile or width of the cut produced by powerful laser radiation (e.g. $CO_2$) optical radiation at $\lambda$=10.6 $\mu$m) depends on the polarization orientation of the beam with respect to the cutting direction. This phenomenon is illustrated in FIG. 2a. As shown, the cutting width 12 is widest when the cutting direction is aligned with the polarization orientation of the cutting beam, as represented by orientation indicator 15. By contrast, the cutting width 11 is narrowest when the cutting direction is parallel to the polarization of the beam, as indicated by 14, and the cutting width 13 is intermediate when the polarization orientation is at some acute or obtuse angle to the cutting direction, as indicated by 13.

It is known in the prior art that uniform cutting results can be obtained when the direction of polarization of linear polarized light kept parallel to the cutting direction. This is illustrated in FIG. 2b where tie cutting width 16, 17, 18 is uniform because the polarization orientation of the incident light 19, 20, 21 is maintained parallel to the cutting direction. Such a system requires that the polarization direction of the cutting beam is dynamically aligned, i.e. rotated, during the cutting process. This requires that the phase retarder can be rotated. One prior art solution to the need to rotate the phase retarder is the use of mirrors to rotate the entire optical system around its optical axis. Such a system is disadvantageous because of the large size required for the optical set up. Furthermore, the need for critical alignment of the mirrors requires that the optical system be mechanically isolated from vibration during operation. These disadvantages add to the cost of the cutting tool.

A preferable approach to aligning the polarization orientation of a high power laser beam is through phase shifting of the polarization components. One such prior art approach is illustrated in FIG. 3. A transmissive type phase retarder is illustrated comprised of a multi-layer 35 coated phase shifting plate 30. Use of the illustrated half-wavelength plate or a combination of two quarter-wavelength plates allows rotating the plane of polarization of a light beam very effectively, as taught by Born and Wolf in Principles of Optics. London, England, 1975 at pp. 52–59. The theory and fabrication methods of plates with multi-layer coatings 35 are well known. See, e.g. W. H. Southwell, "Multilayer Coating Design Achieving a Broad Band 90° Phase Shift," Appl.Opt., 8–1980, pp. 2688–2692; T. N. Krylova, "The Reflection of Light from a Coated Surface at Various Angles of Incidence," Soviet J. Opt. Tech., 1968, vol. 11, No 12, pp. 695–698; U.S. Pat. No. 4,536,063 to Southwell, "Transmissive Phase Retarder." A disadvantage of the illustrated prior art phase retarder is the necessity of their orientation at some angle 37 with respect to the incident laser beam 32. This angle of incidence causes a displacement 34 of the light beam 33 as it passes through transmissive plate 30, causing an undesired displacement in the propagation path of the incident beam 32. This displacement must be compensated for by means of additional optical elements, thus making the total system more complicated and increasing the system's dimensions along the propagation direction of light. When a dynamic rotation of the tilted multilayer-coated phase retarders is needed for the optimal cutting application discussed above, it is obvious that the propagation path of the beam is continuously changing, thus requiring a highly complicated optical system to compensate for the propagation path deviations introduced by the illustrated phase retarder. Another disadvantage arising from the inclined orientation of the multi-layer coated transmissive phase retarder illustrated in FIG. 3 is that the active area 31 of the device increases with the angle due to the projection principle. In other words, as the angle 37 increases, the beam 32 is incident across a larger surface of the retarder, thus requiring a larger element.

The prior art phase retarders have several disadvantages. Both reflective and transmissive phase retarders introduce lateral displacements into the propagation path of the incident beam (by reflection for reflective types and because of the angle of incidence and refraction for transmissive types). Additionally, angled retarders must be larger than the beam size to handle the larger diameter that is projected across the incident surface. Careful selection of materials is required because of the need to minimize residual absorption of the optical beam's energy.

What is lacking in the prior art is a highly efficient phase retarder having a large transmission coefficient, appropriate for high power and large laser beam applications, that can be removed from the application without affecting the propagation path of the laser and that is insensitive to lateral displacements or vibrations. Furthermore, rotation of the device should rot affect the propagation path of the laser beam. These and other shortcomings in the prior art are overcome by the preferred embodiments of the present invention described in detail below.

SUMMARY OF THE INVENTION

The present invention provides optical components that are advantageous over the optical components of the prior art. One application where the present invention has particular use is in high optical power, large beam laser material processing (e.g. with $CO_2$ lasers), although the invention ma y be embodied for use in other applications as well. The traditional elements for controlling the polarization state do not satisfy industrial application needs due to large material or large manufacturing costs of the components. The set of industrial-proof optical components is hence limited. An advantageous feature of the preferred embodiments of the present invention is that widely used and available material can be used for implementation of the folded phase retarders, which are suitable for industrial applications.

In one aspect the invention provides for a transmissive phase retarder for imposing a phase shift between the polarization components of an incident light beam. The phase retarder comprises a first substrate having an input surface having a plane oriented orthogonally to an incident light beam source, and a first periodically folded internal surface having a repeating triangular profile and having facets at an angle to the plane of the input surface. The device further includes a multi-layer coating adjacent the first internal surface comprising a plurality of first layers having a first refractive index alternative with a plurality of second layers having a second refractive index. The multi-layer coating imposes a phase shift between the polarization components of light transmitted through it. The device further includes an output surface having a plane oriented parallel to the plane of the input surface.

In another aspect, the invention provides for a transmissive phase retarder comprising a first element having a flat input surface and a first periodically folded output surface, a second element adjacent said first element and having a first periodically folded input surface aligned with and complementary in shape to said first periodically folded output surface of said first element and having a first periodically folded output surface, and a third element adjacent said second element and having a second periodically folded input surface aligned with and complementary in shape to said first periodically folded output surface and having a second flat output surface aligned in parallel with the flat input surface. The device further includes a first anti-reflection composite phase shifting coating interposed between said first and second elements and being comprised of alternating layers of first and second material, the first material having a high refractive index relative to the second material and a second anti-reflection composite phase shifting coating interposed between said second and third elements and being comprised of alternating layers of said first and second material. The device provides the advantageous feature that the first and second periodically folded output surfaces and the first and second periodically folded input surfaces having facets oriented at an angle with respect to the first input surface and the flat output surface.

In yet another aspect, the invention provides for a 21a method for converting a polarized light beam having one spatially independent polarization state into a polarized light beam having another spatially dependent polarization state. The method includes directing a laser beam orthogonally to a flat surface of a phase retarder, passing the laser beam through a first phase retarding multi-layer structure coated on a first component of the phase retarder having triangular cross-sections oriented along a predefined path, introducing a spatially dependent phase shift and introducing a first lateral displacement of the laser beam and passing the laser beam through a second phase retarding multi-layer structure coated on a second component of the phase retarder having triangular cross-sections oriented along a predefined path, which is complementary with the first triangular cross-sectional component, introducing an equal and additional phase shift and providing a second lateral displacement of equal magnitude as, but in an opposite lateral direction to, the first lateral displacement. In other aspects, the method further includes; passing the laser beams through an antireflection coating prior to the step of passing the laser beam through the first phase retarding multi-layer structure, and passing the laser beam through a second anti-reflection coating subsequent to passing the laser beam through the second phase retarding multi-layer structure.

An advantageous features of the preferred embodiments of the present invention is that one can insert the phase retarder into an optical setup (such as a laser cutting tool) without affecting the propagation paths of the visible and invisible laser beams. The laser beams are orthogonally incident and emergent such that alignment of the device is straightforward. A further advantageous feature is that the device does not have an optical axis and therefore as long as the beam enters the device orthogonally, vertical or horizontal displacements due to vibrations will not affect the operation. Advantageously, when the preferred embodiment phase retarder is rotated with respect to is axis of symmetry, the propagation path remains undisturbed. A yet further advantageous feature of the invention is that it can be embodied in a novel phase retarder having a reduced overall thickness and diameter. This provides for reduced costs for the preferred embodiments. Another advantageous feature is that the preferred embodiment folded phase retarding element occupies substantially less space along the propagation direction of the laser beam than prior art devices.

BRIEF DESCRIPTION OF THE DRAWINGS

The above features of the present invention will be more clearly understood from consideration of the following description in connection with the accompanying drawings, in which.

DETAILED DESCRIPTION OF THE PREFERRED EMBODIMENTS

The making and use of the presently preferred embodiments are discussed below in detail. However, it should be appreciated that the present invention provides many applicable inventive concepts that can be embodied in a wide variety of phase retarding components. The specific embodiments discussed are merely illustrative of specific ways to make and use the invention, and do not limit the scope of the invention.

Figure 4A:
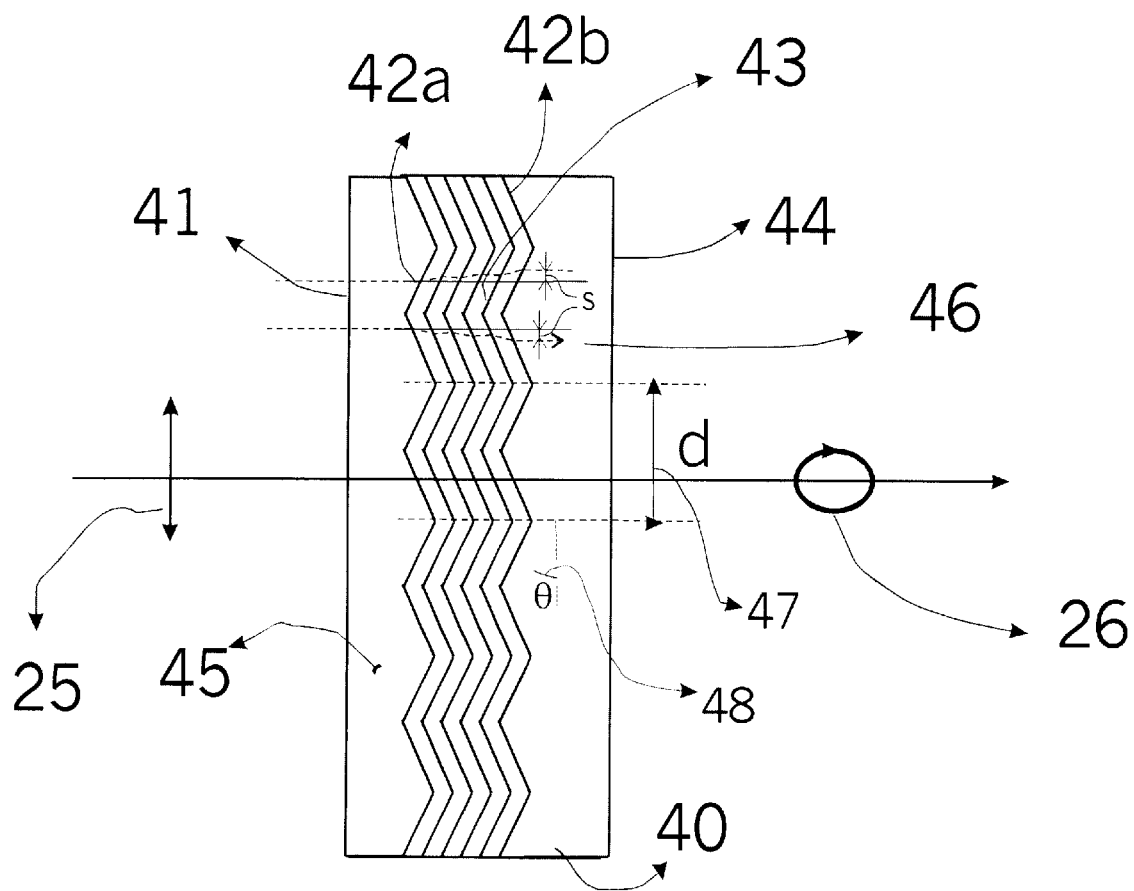
FIG. 4a shows a folded version of a triangular phase retarder.

In FIG. 4a, a preferred embodiment phase shift element 40 is shown. The phase retarder 40 includes a first substrate 45 featuring a flat input surface 41 and emergent surface 42a, which has a triangular cross-sectional surface having facets at an angle to the plane of the input surface 41. The period 47 of the triangular form, "d" preferably is much greater than the wavelength $\lambda$ of the incident light in order to avoid diffraction effects. One can deduce that when the period of the folded surface is about 20 times larger than the wavelength, the diffracted pattern closely coincides with the refracted pattern, which would exist in the infinite period, flat device case. The larger the period, however, the deeper triangular folds are required, which leads to thicker substrates and more material removal, herce a slower fabrication process. When the period is large, the number of sharp cusps and tips are limited. At these sharp cusps and tips, scattering losses are introduced. Hence, depending on the wavelength, a range of periods "d" exists, where the tradeoff between scattering, diffraction and fabrication is optimized. At an exemplary wavelength of 10 $\mu$m, the period is preferably in the range between 500 $\mu$m and 2 mm. The folds of emergent surface 42a are declined at an angle $\Theta$ (48) with respect to the input facet 41. A multi-layer phase shifting coating 43 is deposited on the folded triangular surface 42a. The angle $\Theta$ (48) and the multi-layer film are chosen to fulfill the desired phase shift as a matter of design choice, as will be apparent to one skilled in the art. The design can be made robust such that the angle accuracy is not too critical allowing for the angular accuracy of the declined surface to be of the order of 1 to 2 degrees, as described below.

Figure 1:
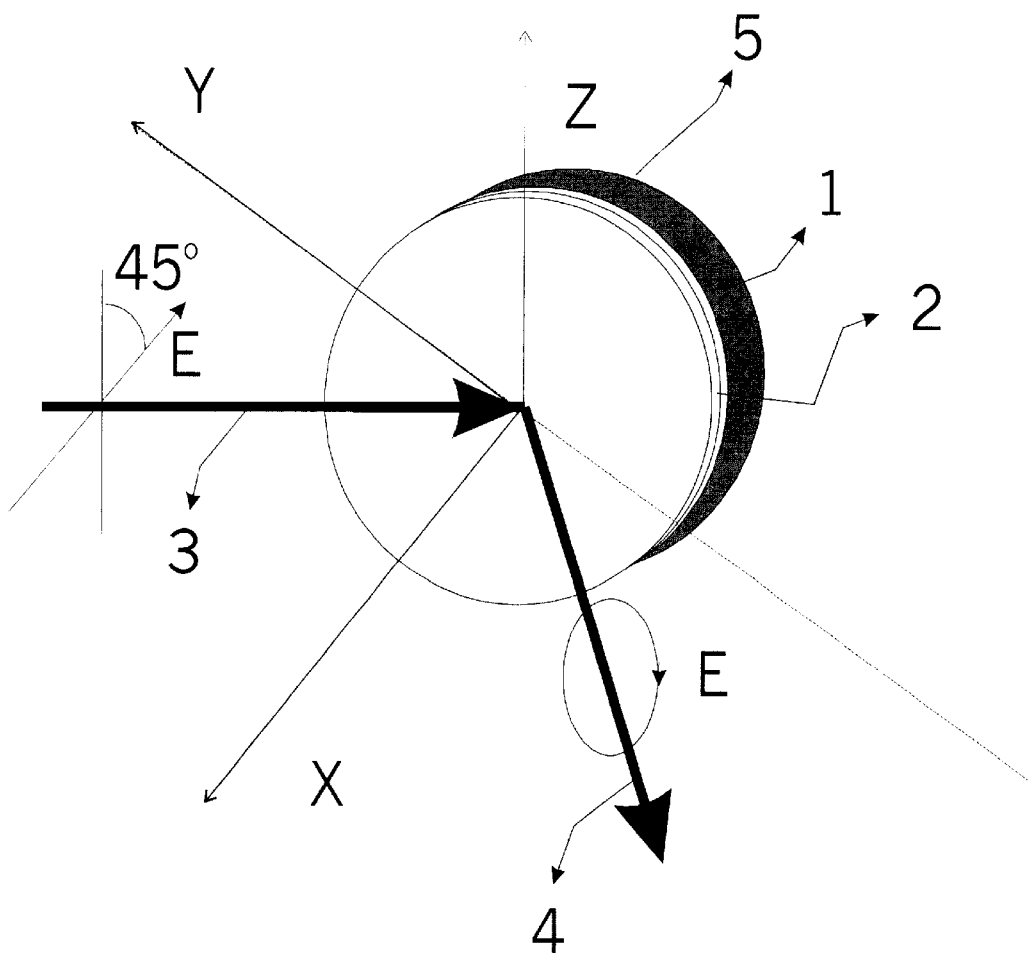
FIG. 1 shows a prior art reflection phase retarder.
Figure 2A:
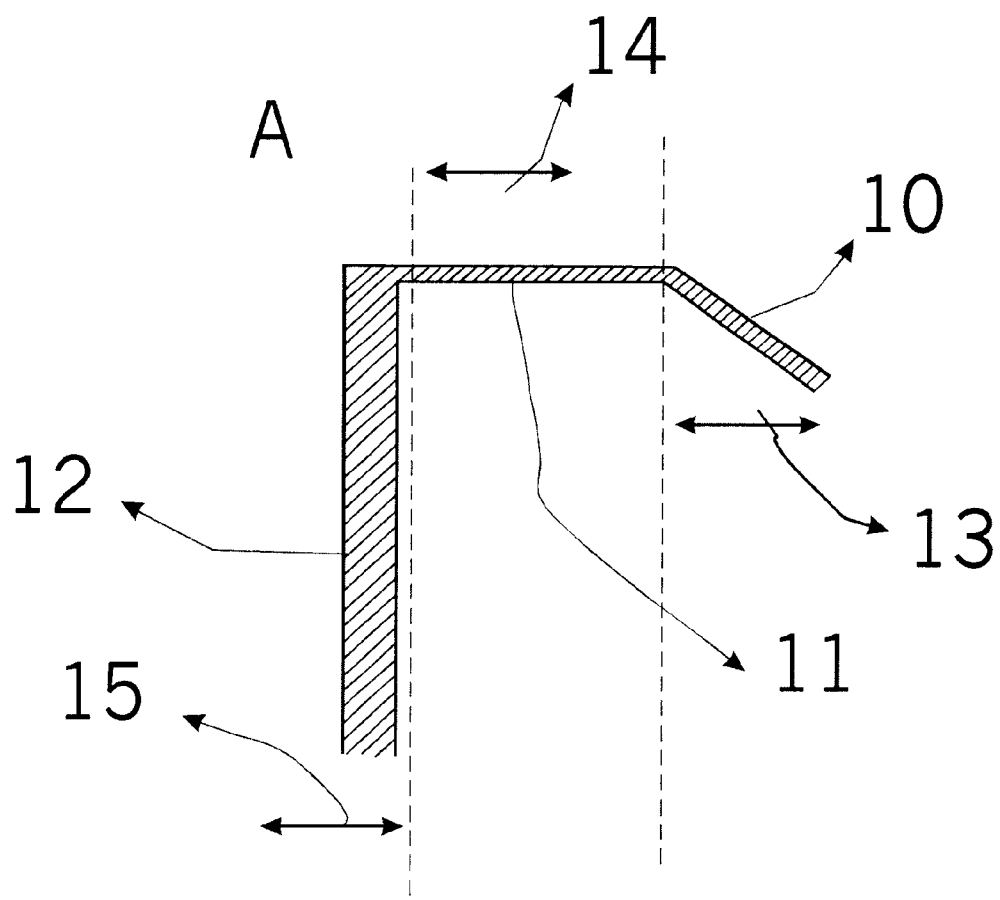
FIGS. 2a and 2b show static and dynamically adapted laser assisted cutting profile, respectively.
Figure 2B:
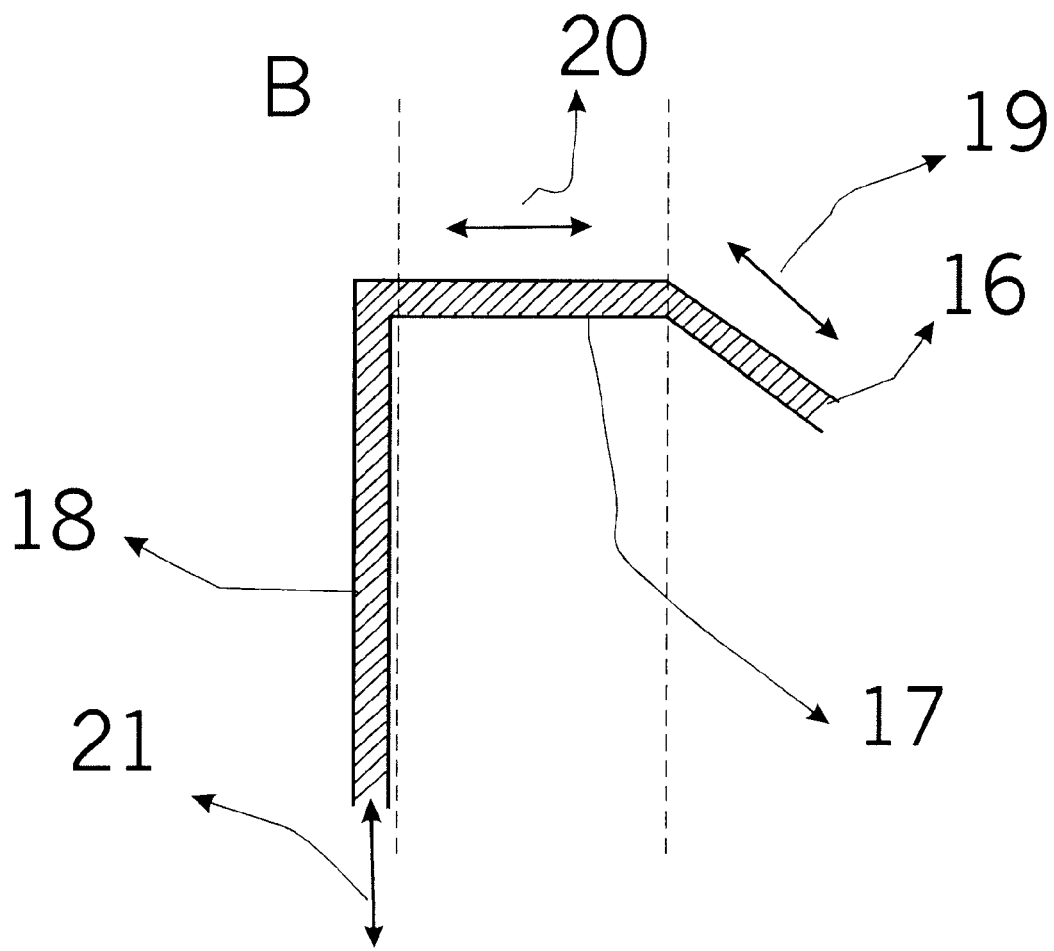
Figure 3:
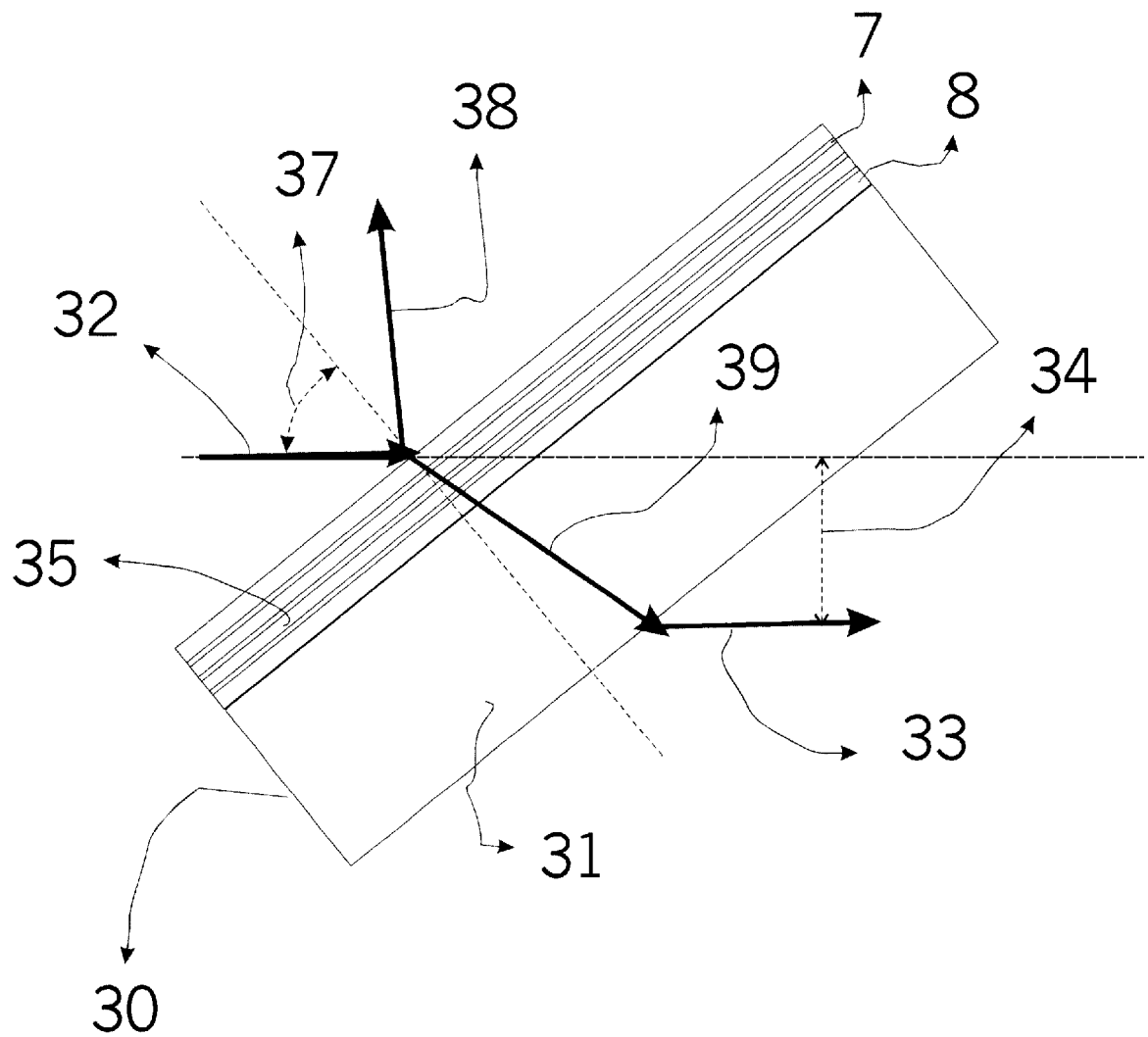
FIG. 3 shows a prior art multi-layer coated transmissive phase retarder.

Certain desirable characteristics for a phase retarder will be discussed with reference to the prior art device illustrated in FIG. 3. As shown, substrate 31 (typically either glass or transparent crystal) is coated with "i" alternating transparent layers, each having a thickness d. The linear polarized optical beam 32 impinges on the structure at the angle $\Theta_0$ as notated by reference numeral 37. A portion of the beam 38 reflects in the direction $I_R$. The other portion of the beam 39 propagates through the thin film layers 35 and through the substrate 31 in the direction $I_T$ (for the purposes of this discussion, the portion of the beam which is lost in the structure by residual absorption is ignored). Transmitted beam 39 passes out of substrate 31 via the flat output surface. Typically, the output surface will have an anti-reflection coating on it. Details of the design for a transmissive multi-layer phase retarder in which reflection of an incident beam of light is substantially reduced and in which the incident light experiences a phase retardation between the s- and p-plane polarization components of the transmitted light are provided in U.S. Pat. No. 4,536,063 to Southwell. The adjacent layers (7,8) are made of materials of substantially different indexes of refraction n. The optical thicknesses d of the transparent layers are determined by means of a cost function expressing combined conditions of a desired maximum transmission coefficient for both polarization states and a specified phase shifting of the s- and p-plane polarization components of the transmitted light for a broadband range of wavelengths at a specified angle of incidence $\Theta_0$. Typically two coating materials, one of with a low refractive index (8) and one with a high refractive index (7) can be used in an alternating fashion to form the multi-layer configuration.

One of the advantages of multi layer structures is that by increasing the number of thin film transparent layers in the design it is possible to achieve improved performance in terms of a broader wavelength band, a wider range of angles of incidence $\Theta_0$ and a wider range of phase retardation. Further details of a preferred embodiment phase retarder will now be provided. An exemplary prior art phase retarder is described having a twelve layer, anti-reflection, 90° phase shift coating for use at a 45° angle of incidence (of the incident light beam). For operation at the optical wavelength $\lambda=10.6\,\mu m$, zinc selenide (ZnSe, n=2.403) can be used as the high refractive index coating material and thorium fluoride (ThF$_4$, n=1.35) as the low refractive index coating material. The phase retardation is 88.2 –92° for an incident angle $\Theta_0$ of between 40° and 47°. The device exhibits good light transmission, having transmission coefficients T$_s$ and T$_p$ for s- and p-plane components of 0.984 and 0.979, respectively.

Figure 6A:
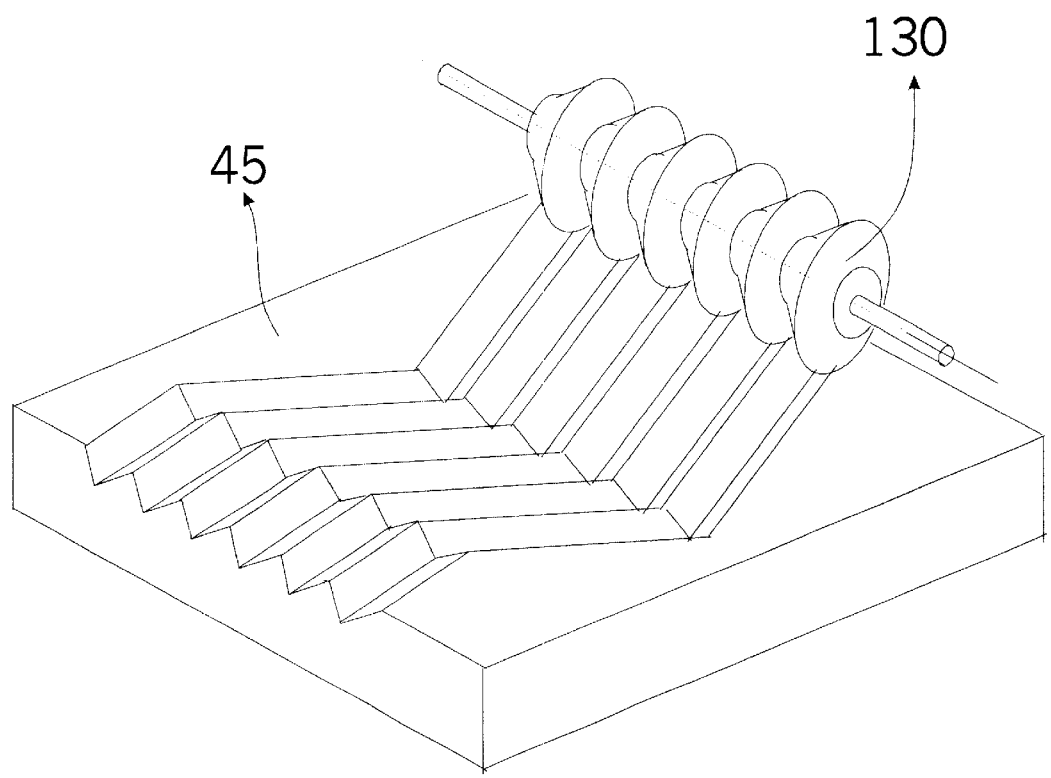
FIG. 6 shows preferred embodiments of the tools to make higher functionality folded optical elements.
Figure 6B:
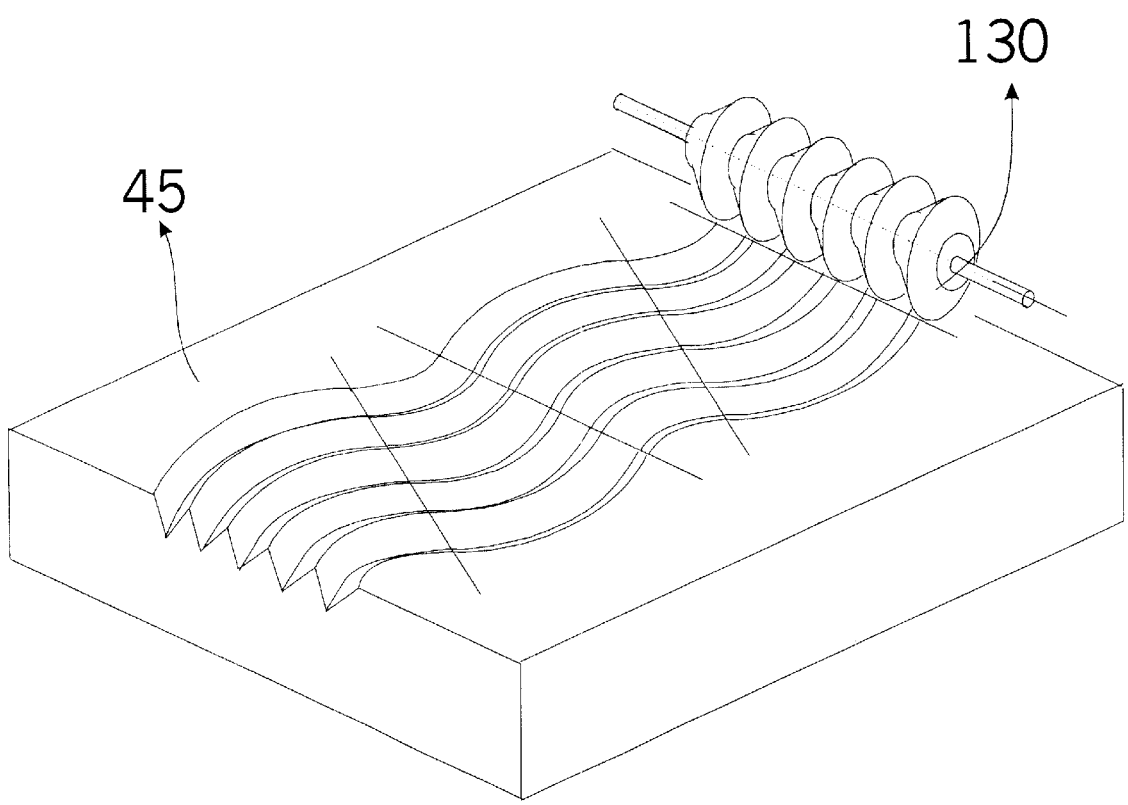
Figure 6C:
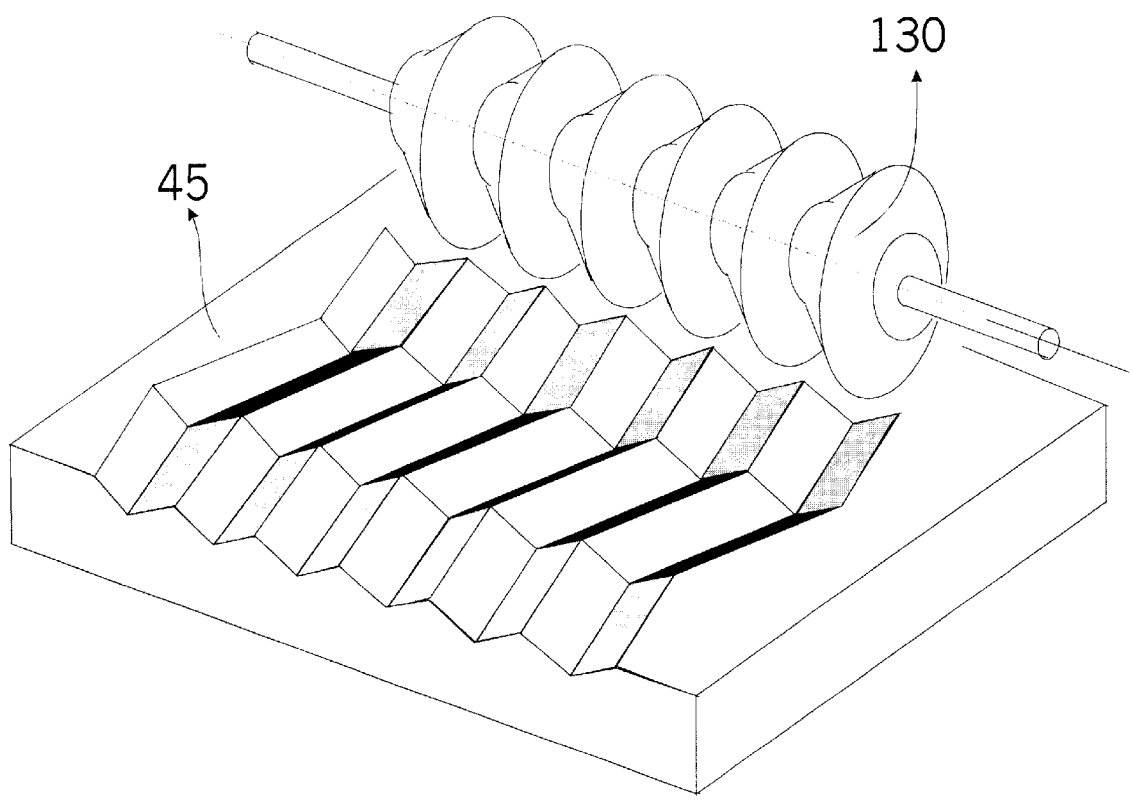

Referring again to FIG. 4a, assume that the 12-layer prior art structure described above is made of alternative ZnSe-ThF4 optical layers and that the substrates 45 and 46 are made from ZnSe. The incident angle 450 in air for the prior art device will correspond to an declination angle of 17.110 of the internal ZnSe surface 42a,b for this invention (due to the different refractory characteristics of ZnSe versus air). Let the period d=1 mm, than the depth of the grooves of folded surfaces 42a and 42b is 0.15 mm. The elements 45 and 46 can be made from commercially available ZnSe optical windows having a diameter of 1.5" and a thickness 3 mm. The thickness of the optical element 40 would therefore be approximately 6 mm. Preferably, both input surface 41 and output surface 44 (or in the case of FIG. 6, both input and output surfaces 62a and 62b, respectively) will have an anti-reflection coating 121, 122 on their surfaces. For the case of a typical high power CO2 laser beam operating at mid-IR wavelengths, the anti-reflection coating is preferably from ThF4, BaF2, MgF2, SrF2, or IRX. In the preferred embodiments, the low refractive index coating material will be selected from this group of materials or similar materials, as well. The high refractive index coatings could preferably be of ZnSe, ZnS, Si, Ge, PbTe, and KRS-5, and similar materials.

Figure 4B:
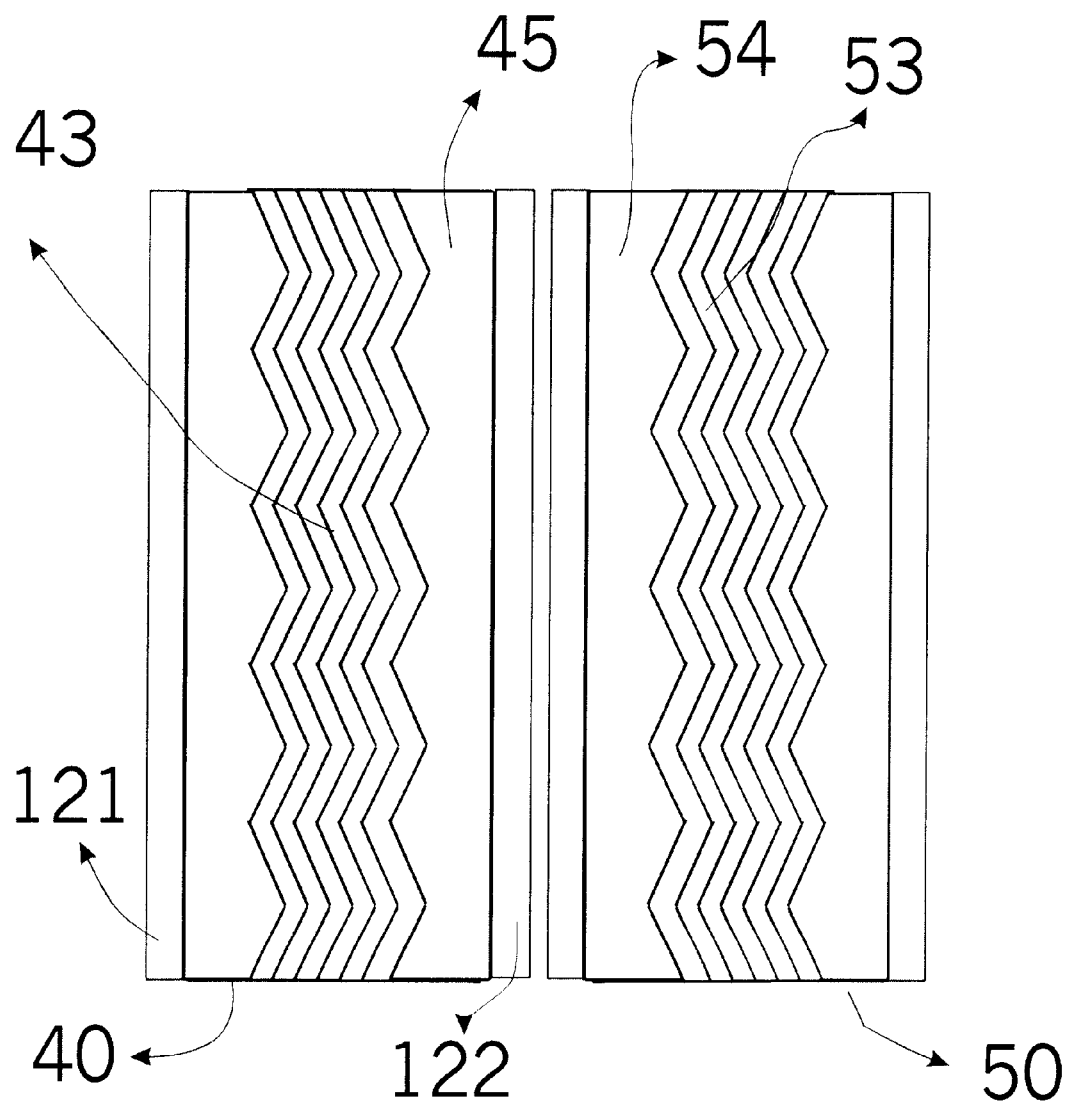
FIG. 4b shows a folded version of a stacked triangular phase retarder.

A second substrate 46 is attached to the coated folded surface 43. This second substrate has a flat surface 44 and a triangular folded surface 42b, which is complementary to the triangular folded surface 42a of the first substrate 45. Preferentially the first substrate 45 and the second substrate 46 are made from the same material in order to maximize the transmission through the complete element 40. When the beam emerges from the second emergent surface 44, the beam is displaced with respect to the input beam by a distance "s". This is due to refraction as the beam passes through substrates 45 and 46. In order to compensate for the beam displacement, it is preferable to use a second element 50, which has a similar structure as 40 but with a folded surface cross-section 53 being opposite or complementary to the cross-section 43 of the first element 40, as illustrated in FIG. 4b. Elements 40 and 50 can be combined together in various ways, such as be mechanical pressing, compounding, gluing with an index matching cement, or other well known alternative. The resulting structure provides a phase retarder, which has no optical axis, meaning that the optical element can be displaced (e.g. due to vibration) without displacing the laser beam. The structure provides a further advantage of being relatively thin and, because the element is aligned orthogonally to the incident beam, it can be substantially smaller in cross section that prior art phase retarders that are oriented at an angle to the incident beam. Another advantage of the preferred embodiment phase retarder is its flat input and output surfaces, which significantly ease alignment tolerances.

Figure 4C:
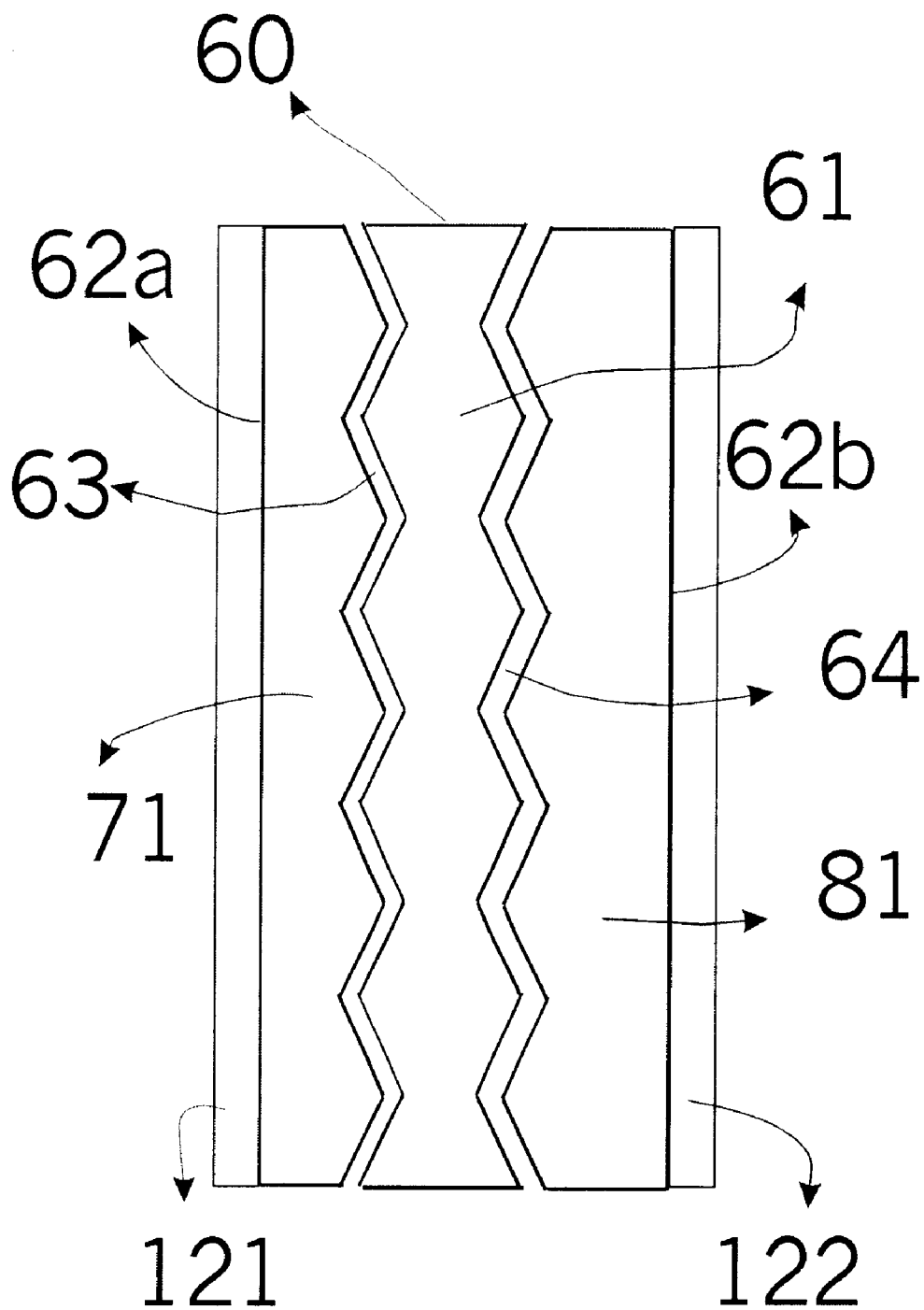
FIG. 4c shows a folded version of a stacked triangular phase retarder.

Another preferred embodiment phase retarder 60 is illustrated in FIG. 4c. In this embodiment, three substrates are employed, rather than the four substrates required for the phase retarder illustrated in FIG. 4b. This is accomplished by use of single homogenous internal substrate 61, which takes the place of substrates 45 and 54 of the device illustrated in FIG. 4b. Substrate 61 has two folded surface elements, rather than the single folded surface and single flat surface of substrates 45 and 54 (which flat surfaces are effectively merged into one when the two devices 40 and 50 are combined together).

For the device illustrated in FIG. 4b, the total phase retardation is equal to the sum of the phase shift introduced in clement 40 plus the shift introduced in element 50. The total phase retardation is preferentially equally divided between the two sub-elements 40 and 50, such that substantially identical elements can be combined for obtaining a minimal displacement. The number of coating layers, 43, 53, which need to be deposited during the manufacturing process can be divided by two with respect to a prior-art flat transmissive phase retarder because an equal number of the coatings are deposited on the folded surface for both elements 40 and 50. This provides an advantageous reduction in manufacturing costs and price.

When one wants to rotate the plane of the linear polarized light, such as is needed for typical cutting applications, two such elements 40 will be needed, leading to a final thickness of 12 mm. For such a 180° phase retarder, the preferred embodiments of the present invention provide the advantage that the rotation of the folded phase retarder to dynamically adapt the plane of polarization is effectuated without affecting the propagation path of the laser beam. This is particularly advantageous in the case of laser cutting tools, as described above.

Figure 5A:
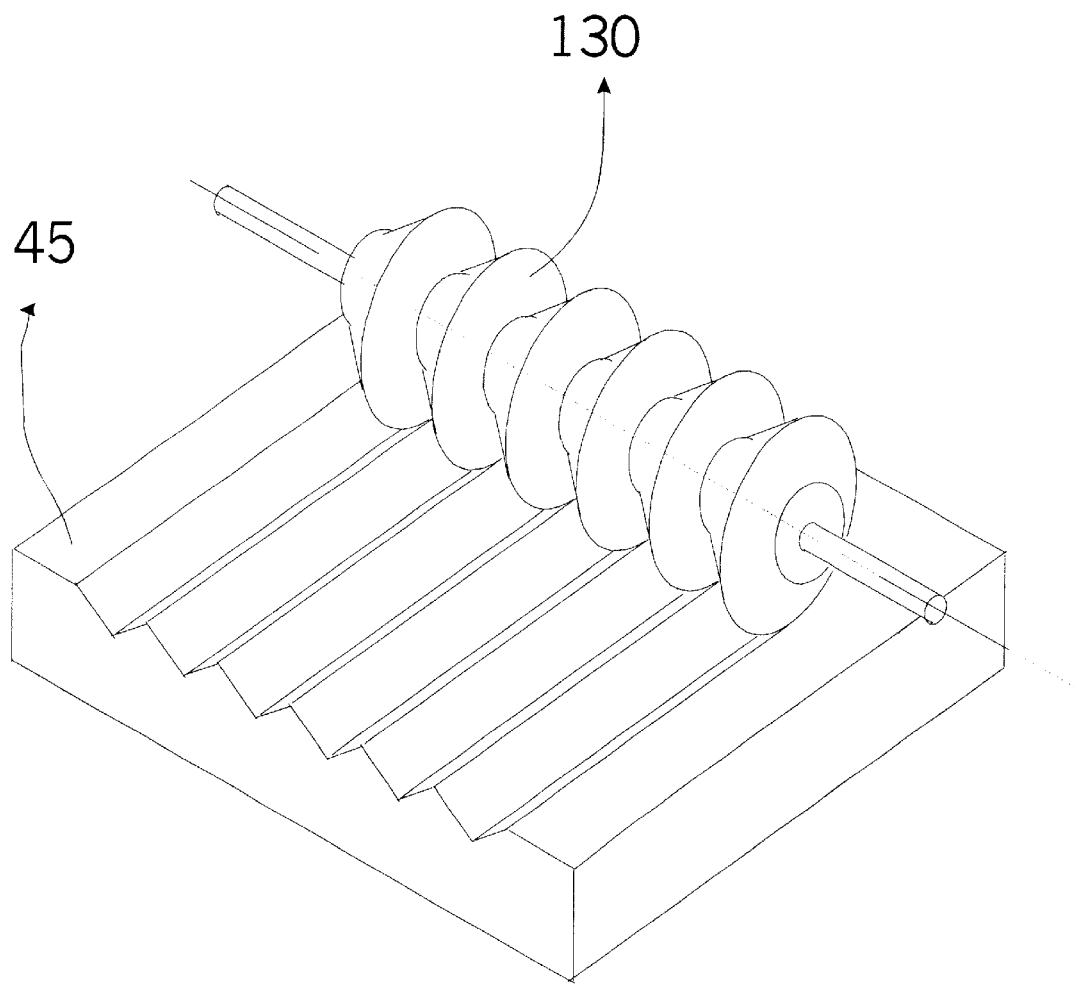
FIG. 5 shows preferred embodiments of the tools to make the folded optical elements.
Figure 5B:
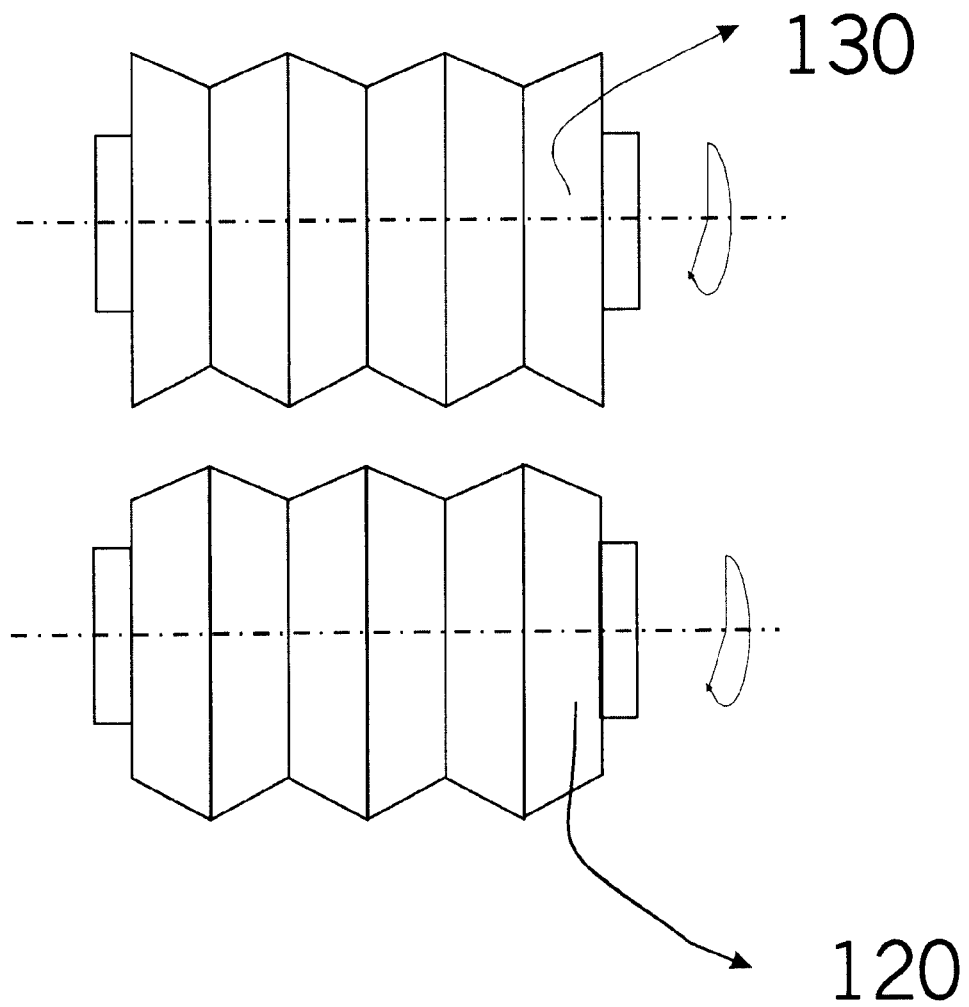

FIGS. 5a and 5b illustrate a preferred approach to fabricating the folded surface 42a of substrate 45 and complementary folded surface 42b of substrate 46. As shown in FIG. 5b, two separate grinding tools are used. A first grinding tool 120 has a saw-tooth profile corresponding to the profile of folded surface 42a of substrate 45. The second grinding tool has a (complementary) shape of folded surface 42b of substrate 46. The cutters 120 and 130 are designed to be rapidly rotated and brought into contact with the surface of the substrate to be shaped, as illustrated in FIG. 5a, as is well known in the art. By moving the substrate orthogonally to the rotation axis of the grinding tool, the folded surface is patterned over the whole area of the folded surface 42a or 42b. Surface profiles with accuracy of better than 1 $\mu$m can be obtained. One skilled in the art will recognize that internal substrate 61 of element 60 can be formed by employing two identical cutters 120 to simultaneously form the two folded surfaces (or alternatively, a single cutter 120 could be employed to grind each surface in sequence).

In the preferred embodiments, the two cutters 120 and 130 are carefully matched to each other. This matching allows implementing more complicated two-dimensional folded structures. The well-known phase retarders of 90 and 180 degrees are characterized by a spatially invariant phase retardation function. In this invention the spatially invariant phase retardation function is translated into a folded form where all the grooves are parallel to each other over the whole area. Two-dimensional phase retardation functions are implemented by patterning more complicated folded structures. For example the two matched cutters allows for forming the optical elements for different purposes: for forming the linear-distributed polarization along the beam profile, the conversion of linear or circular polarized light into a beam with randomly, statistically distributed polarization states, and so on. Examples of such one or two dimensional distributed retardation functions are given in FIGS. 6a, 6b, 6c. These functions are realized by moving the substrate along a predefined curve when the grinding tool is patterning the folds.

After depositing the multi layer phase shift coating on the one of these elements, the combined element will produce the polarization with regular or irregular distribution depending on the profile of cutters and hence of the resulting folded surfaces. The cutters are preferably formed of a hard material such as a metal disk coated with a diamond or Silicon Carbide film.

The introduction of folded surfaces for phase retardation elements leads to elements with reduced total area due to the absence of the projection problem encountered in the classical multi-layer phase retarders operating under oblique incidence. For devices, which normally operate at an angle of 45 degrees, the diameter of the phase retarding devices can be shrunk by a factor of about 14. As the diameter shrinks it is obvious that the thickness can be proportionally reduced. The optical setup can be more compact and the mechanical housing of the device can be reduced as well. The obliquely operating prior art phase retarder of e.g. 1.5" diameter occupies almost 7 times more space along the propagation direction than the folded version of the phase retarder described above.

Figure 7:
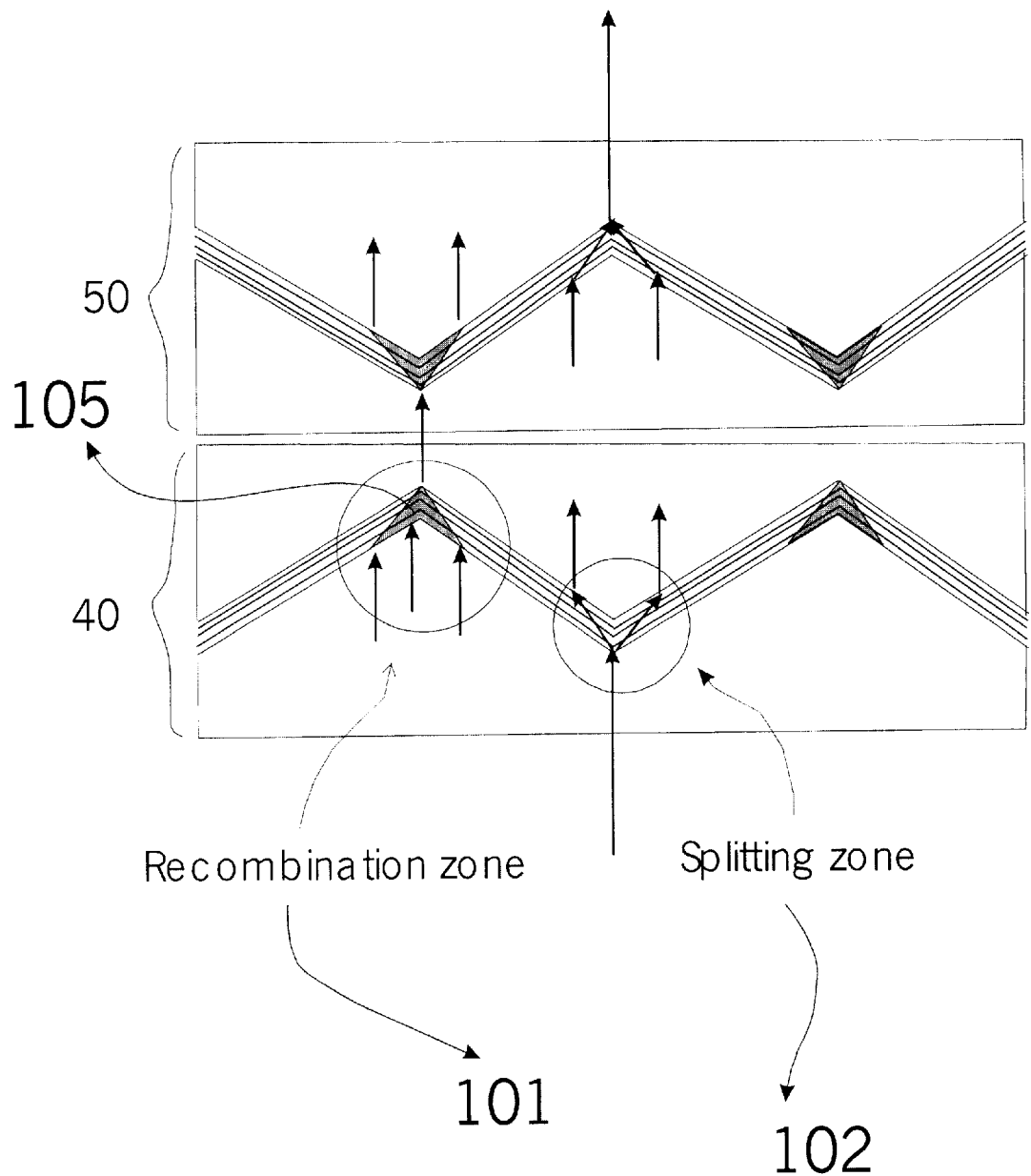
FIG. 7 shows a folded preferred version of a triangular phase retarder.
Figure 8:
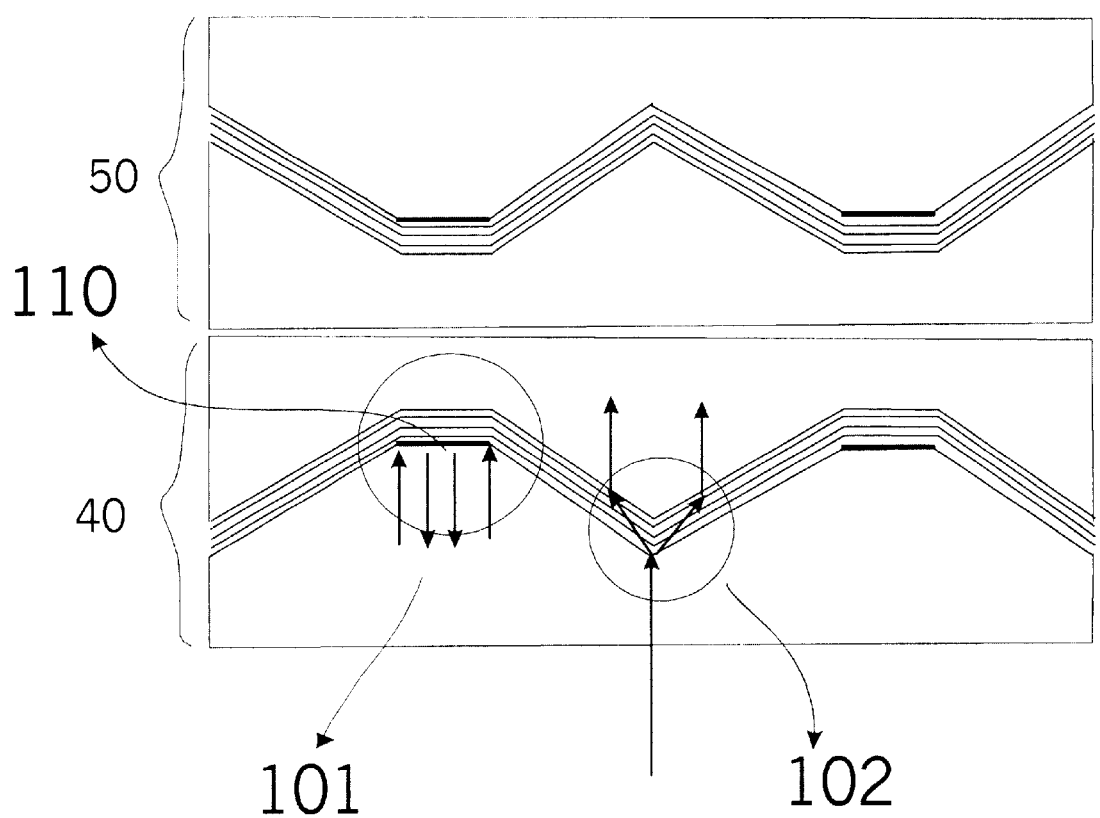
FIG. 8 shows a folded version of a trapezoidal phase retarder with partial reflectivity.
Figure 9:
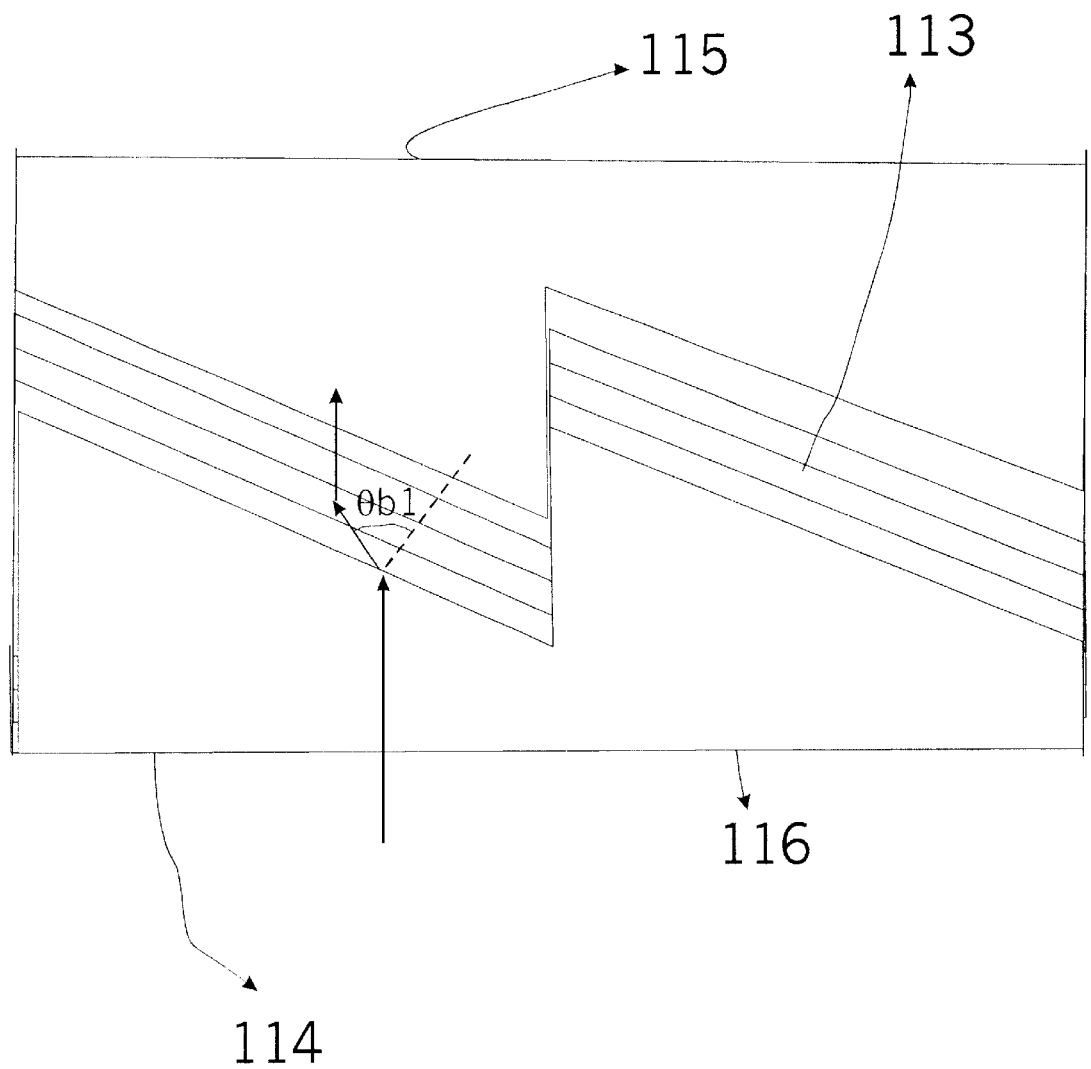
FIG. 9 shows a folded version of a trigonal phase retarder.

Further details regarding the folded surfaces 42a, 42b, and particularly the valleys and the crests of the folded surface are illustrated in FIG. 7. As can be seen, certain portions of the folded surface do not contribute to the phase retardation operation of the device due to refraction effects. One can distinguish splitting zones 102 at the valleys of the triangular profiles and recombination zones 101 at the crests. At the crests, the device operates theoretically well but when the crest is somewhat rounded due to the imperfections in the fabrication process the phase retardation angle is not completely satisfied. At the crests of the triangular profile, one can observe that rays propagating inside the shaded region 105 are not impinging on the opposite parallel interface but on the interface of the other slope of the triangular fold due to the refraction and hence lead to spurious reflections. Depending on the period d of the folded surface, this may be of minor consequence, however. With a preferred period d in the range of 1 mm, the inefficiency resulting from the discontinuity points of the crests and valleys is roughly only one percent of the total transmitted light. A first solution to have higher retardation efficiencies is to convert the originally triangular fold in a trapezoidal structure as shown in FIG. 8 whereby the tips of the triangular shape in shaded regions 105 of the recombination zones 101 are flattened and covered with a reflective layer 110. This induces a small loss in the transmission efficiency of the phase retarder, but the accuracy of the phase retardation is higher. Another variant for the folded surfaces 42a, 42b with higher retardation efficiencies can be designed with a periodic trigonal form, as shown in FIG. 9. In this way, the recombination zones 101 of the triangular form are avoided.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, in addition to the materials described above, the substrates can be formed of any suitable materials that are transparent to the considered wavelength. The phase retarder can be embodied using any combination of high and low index material with the appropriate thicknesses at a given angle of incidence. The angle of incidence of 11.7 degrees is only related to this specific example and is not a limiting feature of the invention. The number and thickness of the phase shifting coatings can be modified as a design choice without deviating from the scope of the inventive concept. Other applications and embodiments of the inventive concept will become apparent to one skilled in the art in light of the teachings provided herein. It is therefore intended that the appended claims encompass any such modifications or embodiments.

We claim:

1. A transmissive phase retarder for imposing a phase shift between the polarization components of an incident light beam comprised of a first substrate having:
   an input surface having a plane oriented orthogonally to an incident light beam source;
   a first periodically folded internal surface having a repeating triangular profile and having facets at an angle to the plane of the input surface;
   a multi-layer coating adjacent said first internal surface comprising a plurality of first layers having a first refractive index alternative with a plurality of second layers having a second refractive index, said multi-layer coating imposing a phase shift between the polarization components of light transmitted through said multi-layer component; and
   an output surface having a plane oriented parallel to the plane of the input surface.

2. The transmissive phase retarder of claim 1 further comprising:
   a first anti-reflection coating on said input surface; and
   a second anti-reflection coating on said output surface.

3. The transmissive phase retarder of claim 1 further comprising a second substrate adjacent said first substrate and having:
   a second input surface having a plane oriented parallel to the plane of the input surface of the first substrate; orthogonally to an incident light beam source;
   a second periodically folded internal surface having a repeating triangular profile and having facets at an angle to the plane of the second input surface, the profile of the second periodically folded internal surface being complementary to the profile of the first periodically folded internal surface;
   a second multi-layer coating adjacent said second internal surface comprising a plurality of third layers having said first refractive index alternative with a plurality of fourth layers having said second refractive index, said second multi-layer coating imposing a phase shift between the polarization components of light transmitted through said multi-layer component;
   a second output surface having a plane oriented parallel to the plane of the second input surface; and
   an optical bonding layer between said first output surface and said second input surface.

4. The transmissive phase retarder of claim 1 wherein the imposed phase shift is 90 degrees.

5. The transmissive phase retarder of claim 1 wherein the imposed phase shift is 45 degrees.

6. The transmissive phase retarder of claim 1 wherein said first and second periodically folded internal surfaces have a period in the range of about 500 $\mu$m and 2 mm.

7. The transmissive phase retarder of claim 1 wherein the first and second periodically folded internal surfaces have a period of about 1 mm.

8. The transmissive phase retarder of claim 1 wherein said plurality of first layers are comprised of a material selected from the group of ZnSe, ZnS, Si, Ge, and PbTe.

9. The transmissive phase retarder of claim 1 wherein said plurality of second layers are comprised of a material selected from the group of thorium fluoride, barium fluoride, Magnesium fluoride, and strontium fluoride.

10. A transmissive phase retarder for imposing a phase shift between the polarization components of an incident light beam, comprising:
    a first element having a flat input surface and a first periodically folded output surface;
    a second element adjacent said first element and having a first periodically folded input surface aligned with and complementary in shape to said first periodically folded output surface of said first element and having a second periodically folded output surface;
    a third element adjacent said second element and having a second periodically folded input surface aligned with and complementary in shape to said second periodically folded output surface and having a second, flat output surface aligned in parallel with the flat input surface;
    a first anti-reflection composite phase shifting coating interposed between said first and second elements and being comprised of alternating layers of first and second material, the first material having a high refractive index relative to the second material;
    a second anti-reflection composite phase shifting coating interposed between said second and third elements and being comprised of alternating layers of said first and second material;
    said first and second periodically folded output surfaces and said first and second periodically folded input surfaces having facets oriented at an angle with respect to the first input surface and the flat output surface.

11. The transmissive phase retarder of claim 10 wherein said first and second periodically folded output surface and said periodically folded output surfaces have a triangular shaped profile.

12. The transmissive phase retarder of claim 10 wherein said first and second periodically folded output surface and said periodically folded output surfaces have a trigonal shaped profile.

13. The transmissive phase retarder of claim 10 wherein said first and second periodically folded surface have facets at an angle of about 17.11 degrees relative the flat input surface.

14. A transmissive phase retarder in which reflection of an incident beam of light is substantially reduced whereby the cross section of the optical element is in the form of a substrate and comprising
    a flat top surface;
    a flat bottom surface; and
    a multi-layer periodically folded surface having a trapezoidal form, the trapezoidal shape comprising sloped portions and parallel portions, the parallel portions being parallel to the flat top surface; and wherein
        the incident beam of light experiences a phase shift when passing through the sloped portions of the multi-layer periodically folded surface and the incident light beam is reflected when impinging upon the parallel portions of the multi-layer periodically folded surface.

15. The phase retarder of claim 14 further comprising a metal coating on said parallel portions of the multi-layer periodically folded surface, the metal coating being reflective to the incident beam of light.

16. A method for converting a linear polarized light beam into a circularly polarized light beam comprising the steps of
    directing a laser beam orthogonally to a flat surface of a phase retarder
    passing the laser beam through a first phase retarding multi-layer structure coated on a first triangular cross-sectional component of the phase retarder, introducing a phase shift of 45 degrees and introducing a first lateral displacement of the laser beam; and
    passing the laser beam through a second phase retarding multi-layer structure coated on a second triangular cross-sectional component of the phase retarder which is complementary with the first triangular cross-sectional component, introducing an additional phase shift of 45 degrees and providing a second lateral displacement of equal magnitude as, but in an opposite lateral direction to, the first lateral displacement.

17. The method of claim 16 further comprising the steps of passing the laser beams through an anti-reflection coating prior to the step of passing the laser beam through the first phase retarding multi-layer structure, and passing the laser beam through a second anti-reflection coating subsequent to passing the laser beam through the second phase retarding multi-layer structure.

18. A method for rotating the linear polarization state of a polarized laser beam comprising the steps
    directing a laser beam orthogonally to a flat surface of a phase retarder
    passing the laser beam through a first phase retarding multi-layer structure coated on a first triangular cross-sectional component of the phase retarder, introducing a first phase shift of 90 degrees and introducing a first lateral displacement of the laser beam;
    passing the laser beam through a second phase retarding multi-layer structure coated on a second triangular cross-sectional component of the phase retarder which is complementary to the first triangular cross-sectional component, introducing a second phase shift of 90 degrees and providing a second lateral displacement which is equal in amplitude, but opposite in lateral direction to the first lateral displacement; and
    rotating the phase retarding element in accordance with a desired angle.

19. The method of claim 18 wherein said first triangular cross-sectional component is manufactured by use of a grinding tool shaped in the form of the desired triangular cross section and said second triangular cross-sectional component is manufactured by use of a grinding tool shaped in a complementary form to the desired triangular cross section.

20. A method for converting a polarized light beam having a first spatially independent polarization state into a polarized light beam having a second spatially dependent polarization state comprising the steps of
    directing a laser beam orthogonally to a flat surface of a phase retarder
    passing the laser beam through a first phase retarding multi-layer structure coated on a first component of the phase retarder having triangular cross-sections oriented along a predefined path, introducing a spatially dependent phase shift and introducing a first lateral displacement of the laser beam; and
    passing the laser beam through a second phase retarding multi-layer structure coated on a second component of the phase retarder having triangular cross-sections oriented along a predefined path, which is complementary with the first triangular cross-sectional component, introducing an equal and additional phase shift and providing a second lateral displacement of equal magnitude as, but in an opposite lateral direction to, the first lateral displacement.

21. The method of claim 20 further comprising the steps of passing the laser beams through an anti-reflection coating prior to the step of passing the laser beam through the first phase retarding multi-layer structure, and passing the laser beam through a second anti-reflection coating subsequent to passing the laser beam through the second phase retarding multi-layer structure.

22. The method of claim 20 whereby the said predefined path is defined such that the phase shift is linearly changing along the predefined path.

23. The method of claim 20 whereby the said predefined path is irregular such that the phase shift is randomized along the predefined path.

* * * * *